US006324398B1

(12) United States Patent
Lanzerotti et al.

(10) Patent No.: US 6,324,398 B1
(45) Date of Patent: Nov. 27, 2001

(54) WIRELESS TELECOMMUNICATIONS SYSTEM HAVING AIRBORNE BASE STATION

(75) Inventors: Louis J. Lanzerotti, Morristown; Robert Evan Myer, Denville, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/606,616

(22) Filed: Feb. 26, 1996

(51) Int. Cl.[7] ...................................................... H04Q 7/20

(52) U.S. Cl. .......................... 455/431; 455/436; 455/11.1

(58) Field of Search .................................. 455/11.1, 12.1, 455/13.1, 15, 25, 7, 49.1, 53.1, 54.1, 56.1, 33.1; 342/2, 353; 244/164, 169, 172, 173, 24, 30, 31, 96, 62, 53 R, 58, 158 R; 379/58, 59

(56) References Cited

U.S. PATENT DOCUMENTS 2,598,064 * 5/1952 Lindenblad ........................ 455/11.1
4,697,761 * 10/1987 Long ..................................... 244/62
5,559,865 * 9/1996 Gilhousen .......................... 455/11.1
5,565,873 * 10/1996 Dean .................................... 342/372
5,625,867 * 4/1997 Rouffet et al. ....................... 455/428
5,644,572 * 7/1997 Olds et al. .......................... 455/13.2

FOREIGN PATENT DOCUMENTS

2082995 * 3/1982 (GB) .
WO 95/04407 * 2/1995 (WO) .

* cited by examiner

*Primary Examiner*—Nguyen T. Vo

(57) ABSTRACT

A wireless telecommunications system with a base station positioned on an airborne platform is provided. The system utilizes a ground-based wireless switching center which communicates via a microwave link with a plurality of airborne base stations positioned above a geographic area being serviced by the telecommunications system. The base stations are supported on an airborne platform having a propulsion system designed to maintain the platform and the base stations in position above the geographic area being serviced. Advantageously, the platform may be positioned in the stratonull which is generally very stable and is located above the troposphere, wherein weather variations occur.

19 Claims, 3 Drawing Sheets

400
$426_i$
$414_i$
$426_r$
$440_i$
$414_r$
R
412

WIRELESS TELECOMMUNICATIONS SYSTEM HAVING AIRBORNE BASE STATION

BACKGROUND

1. Technical Field

The present disclosure relates generally to telecommunications and more particularly to a wireless telecommunications system.

2. Description of the Related Art

FIG. 1 depicts a schematic diagram of a portion of a typical wireless telecommunications system designated generally as 10. System 10 serves a number of wireless terminals 22 and 24 that are situated within a geographic area. System 10 comprises wireless switching center 12 that is connected to a number of base stations $\mathbf{14}_i$ and that is also coupled to local and long distance telephone networks 16. Wireless switching center 12 is responsible for, among other things, routing or "switching" calls from and to wireless terminals or, alternatively, between a wireless terminal and a wireline terminal connected to wireless system 10, via local and/or long distance telephone networks 16.

The geographic area serviced by wireless system 10 is partitioned into a number of spatially distinct areas called cells. As depicted in FIG. 1, each cell $\mathbf{20}_i$ is schematically represented by a hexagon. In practice, however, each cell $\mathbf{20}_i$ usually has an irregular shape that depends, for example, on the topography of the terrain serviced by system 10. Typically, each cell $\mathbf{20}_i$ contains a corresponding base station $\mathbf{14}_i$. Base station $\mathbf{14}_i$ comprises antennas and radios to communicate with wireless terminals 22 and 24. Each base station $\mathbf{14}_i$ also comprises transmission equipment to communicate with wireless switching center 12.

In designing system 10, engineers allocate a limited number of frequency channels to each base station $\mathbf{14}_i$ using well known techniques. Base stations $\mathbf{14}_i$ communicate with wireless terminals over these frequency channels. Thus, the number of base stations limits the potential capacity of system 10 for processing calls to and from wireless terminals.

As wireless telecommunications has increased in popularity, designers have developed techniques for increasing the capacity of these wireless telecommunications systems. One common technique is to reduce the size of each cell by "splitting" existing cells into multiple cells. Some designers have even suggested reducing the size of cells to provide so called "microcells" that service very small geographic regions.

The public has resisted use of microcells for several reasons. First, many people fear that electromagnetic radiation from base stations could cause health problems. Further, real estate in populated areas is typically expensive and accounts for about half the cost of the base station. Thus, it is a difficult and expensive proposition to split cells to increase capacity of a wireless telecommunications system.

SUMMARY

In an exemplary embodiment, a telecommunications system uses airborne platforms that are adapted to support wireless telecommunications systems components. The airborne platforms are maintained in position relative to the ground above a geographic region of the earth to which the wireless telecommunications service is to be provided.

BRIEF DESCRIPTION OF THE DRAWINGS

An illustrative embodiment of the present invention is described below in conjunction with the accompanying drawings in which.

DETAILED DESCRIPTION OF PREFERRED EMBODIMENTS

Figure 1:
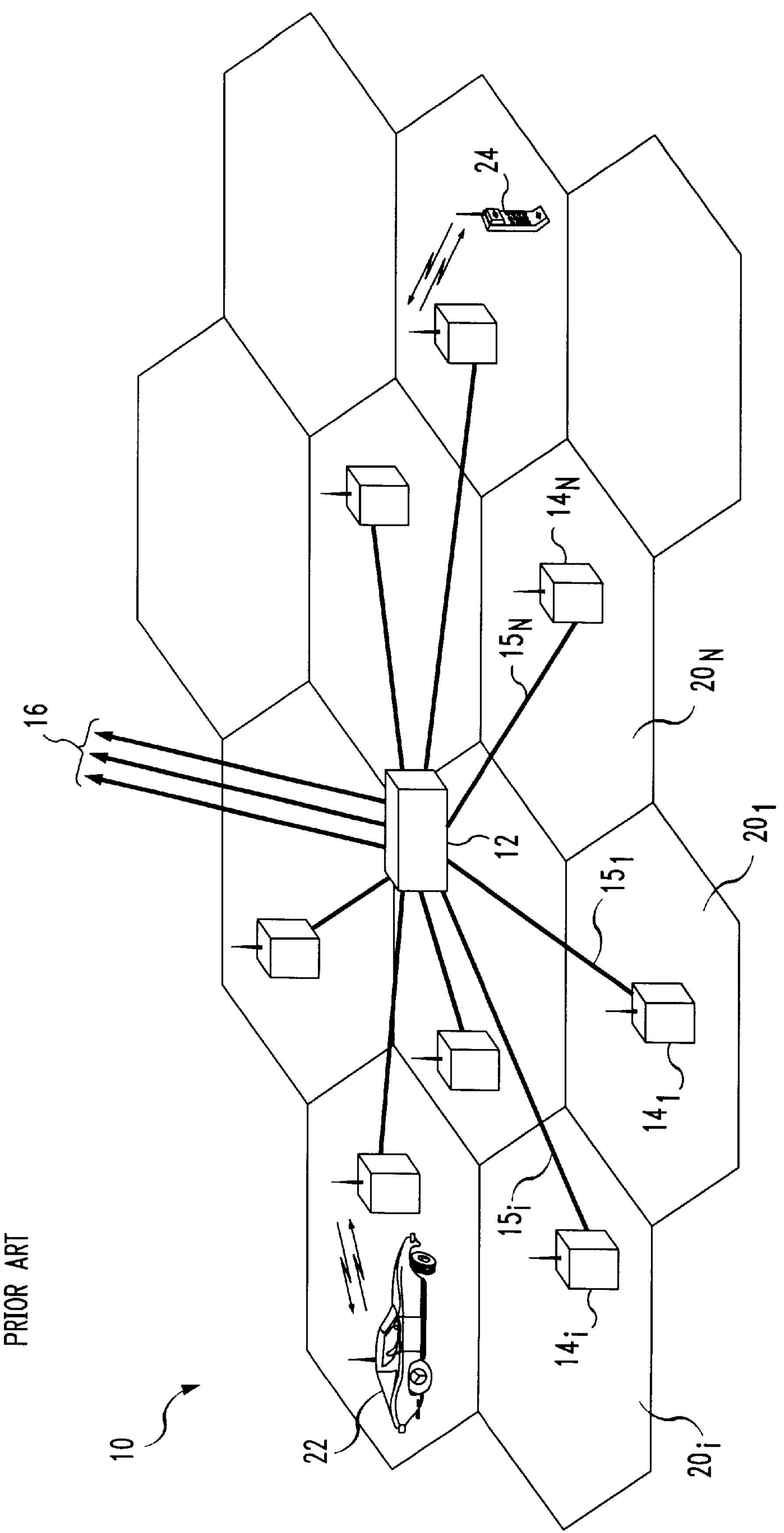
FIG. 1 is a schematic diagram of a prior art wireless telecommunications system.
Figure 2:
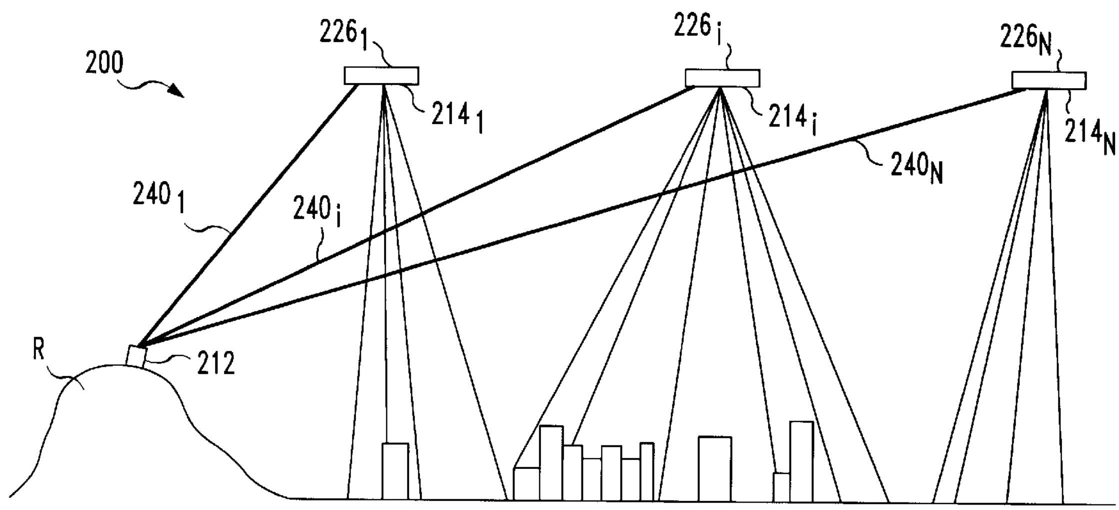
FIGS. 2–4 are schematic diagrams of exemplary embodiments of the present invention.
Figure 3:
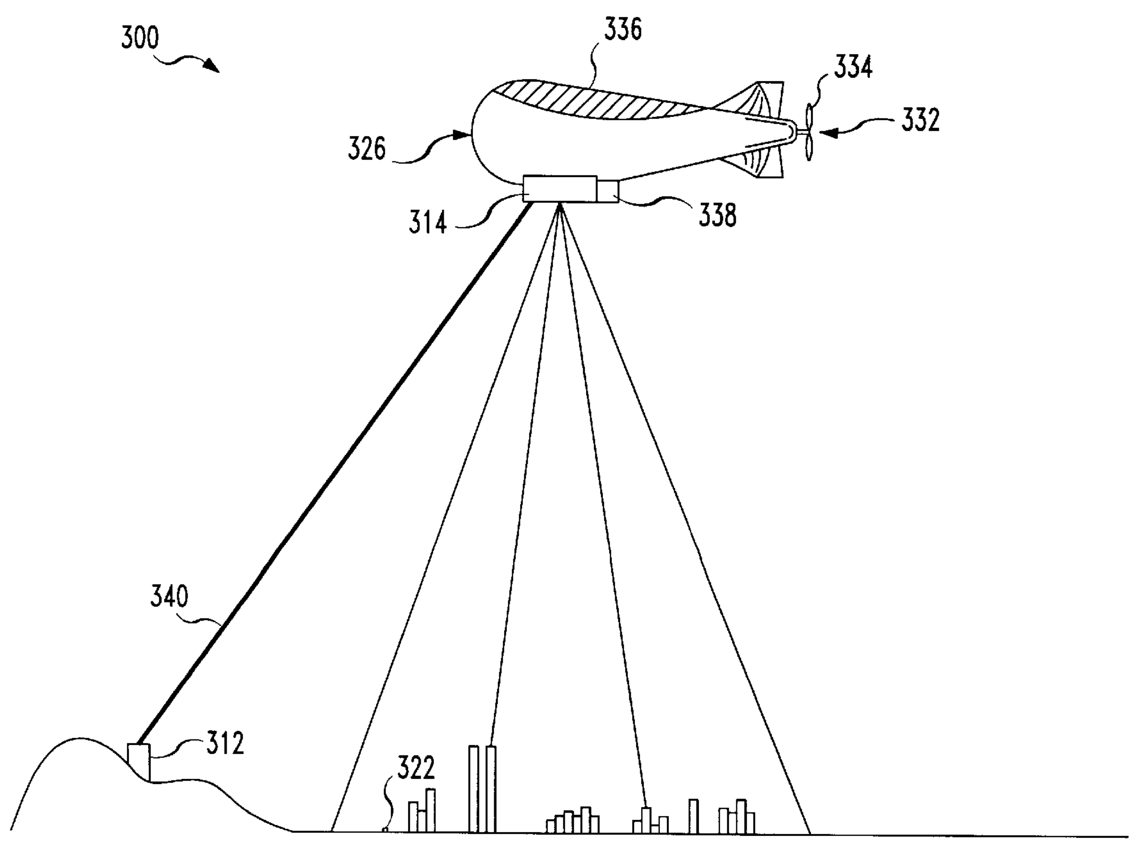

FIGS. 2 and 3 illustrate exemplary embodiments of a wireless telecommunications system. It is to be understood that these wireless telecommunications systems are intended to encompass any wireless communications system utilizing a wireless communication terminal, e.g., cellular, personal communication system (PCS), etc.

FIG. 2 illustrates wireless telecommunications system 200. Wireless telecommunications system 200 includes wireless switching center 212 that routes or switches calls to and from wireless terminals. Wireless switching center 212 includes a central computer which substantially controls operations of communications system 200, including monitoring calls, billing, and handoffs.

In system 200, base stations $\mathbf{214}_i$ are supported on platforms $\mathbf{226}_i$. Each platform $\mathbf{226}_i$ has a propulsion system to maintain the platform airborne in position relative to the ground above the geographic area serviced by system 200. As used herein, the term "airborne" means carried by or through the air and includes flight within the atmosphere, i.e., flight from the troposphere to the edge of the thermosphere. This is in contrast to "spaceborne" which includes flight beyond the atmosphere of the earth. Platform $\mathbf{226}_i$ is advantageously positioned at an altitude not routinely occupied by military or commercial air traffic. Ideally, platform $\mathbf{226}_i$ is located in the stratonull within the stratosphere 15 to 20 miles above sea level. The stratonull is advantageous because it is generally very stable and is located above the troposphere where weather phenomena affecting the environment take place. Platform $\mathbf{226}_i$ may include a vehicle capable of maintaining a substantially stationary position above the earth while supporting at least one base station $\mathbf{214}_i$. Such vehicles include lighter-than-air vehicles and high altitude aircraft. Specific vehicles are described below.

Base station $\mathbf{214}_i$ communicates with wireless switching center 212 via microwave link $\mathbf{240}_i$, operating, for example, in the range of 28 to 38 GHz. Because of the location of base station $\mathbf{214}_i$, wireless switching center 212 may be located in a rural area R where real estate cost and public resistance are minimal. Microwave link $\mathbf{240}_i$ performs the same function as land line $\mathbf{15}_i$ does in conventional wireless telecommunications system 10. However, positional control information may also be communicated to the platform propulsion system via microwave link $\mathbf{240}_i$ using well known techniques. Communication between base stations $\mathbf{214}_i$ via microwave link is also envisioned. In a geographic area having no long distance telephone network, such as some third world countries, inter-base station communication may be used to provide long distance telecommunications.

Each base station $\mathbf{214}_i$ comprises high gain, narrow beam antennas which emit narrow beams in assigned ranges, for example, of 824 to 894 MHz(cellular) or 1900 to 2000 MHz (PCS) to define cells $\mathbf{220}_i$. The narrow beam antennas may be helix array antennas such as those used on Navstar global position satellites. Helix array antennas are discussed in *Antennas*, 2d, John D. Kraus, pages 270 and 271, which is incorporated by reference. Narrow beams facilitate a more uniform distribution of low level RF power reducing radiation levels in populated areas. Because of the location of the antennas, typical problems such as multipath fading, delay spread, doppler, overload and interference are also greatly reduced.

FIG. 3 shows an embodiment of the present invention in which the platform supporting base station 314 is high altitude balloon 326. High altitude balloon 326 may be a balloon, such as disclosed in J. J. Vorchek, U.S. Pat. No. 3,746,282 issued Jul. 17, 1973 and J. L. Rand et al., U.S. Pat. No. 5,104,059 issued Apr. 14, 1992, both incorporated by reference. These high altitude balloons are capable of maintaining altitudes greater than 120,000 feet above sea level for periods of time exceeding several months while supporting a payload.

High altitude balloon 326 is provided with a streamlined body to facilitate horizontal movement while minimizing the effect of winds on balloon 326. Balloon 326 includes propulsion system 332 which may be in the form of propeller 334 driven by an electric motor. A power supply, such as solar cell array 336, is positioned on the balloon envelope to supply energy during daytime to drive propulsion system 332 and to charge batteries 338. Batteries 338 supply energy to propulsion system 332 during nighttime flight. Although balloon 326 is disclosed as having propulsion system 332 including propeller 334 driven by an electric motor, an appropriate propulsion system capable of maintaining balloon 326 in a substantially stationary position over the earth may be used, e.g., jet engine, rocket engine, ion engine, etc.

As shown in FIG. 3, an RF signal transmitted by wireless terminal 322 is received by base station 314 defining the cell from which the RF signal was transmitted. The RF signal is converted to microwave at base station 314 using modulation and demodulation techniques and base station 314 communicates via microwave link 340 with wireless switching center 312. The RF signal is converted to microwave via block conversion which allows a single wireless switching center 312 to handle all of the processing for hundreds of base stations. If the signal is directed to another wireless terminal, wireless switching center 312 returns the signal along with routing data to base station 314 via microwave link 340. Thereafter, the signal is routed, according to the routing data, to the appropriate wireless terminal. If the signal is directed to a wireline terminal, wireless switching center 312 will route the call to the appropriate wireline terminal.

Figure 4:
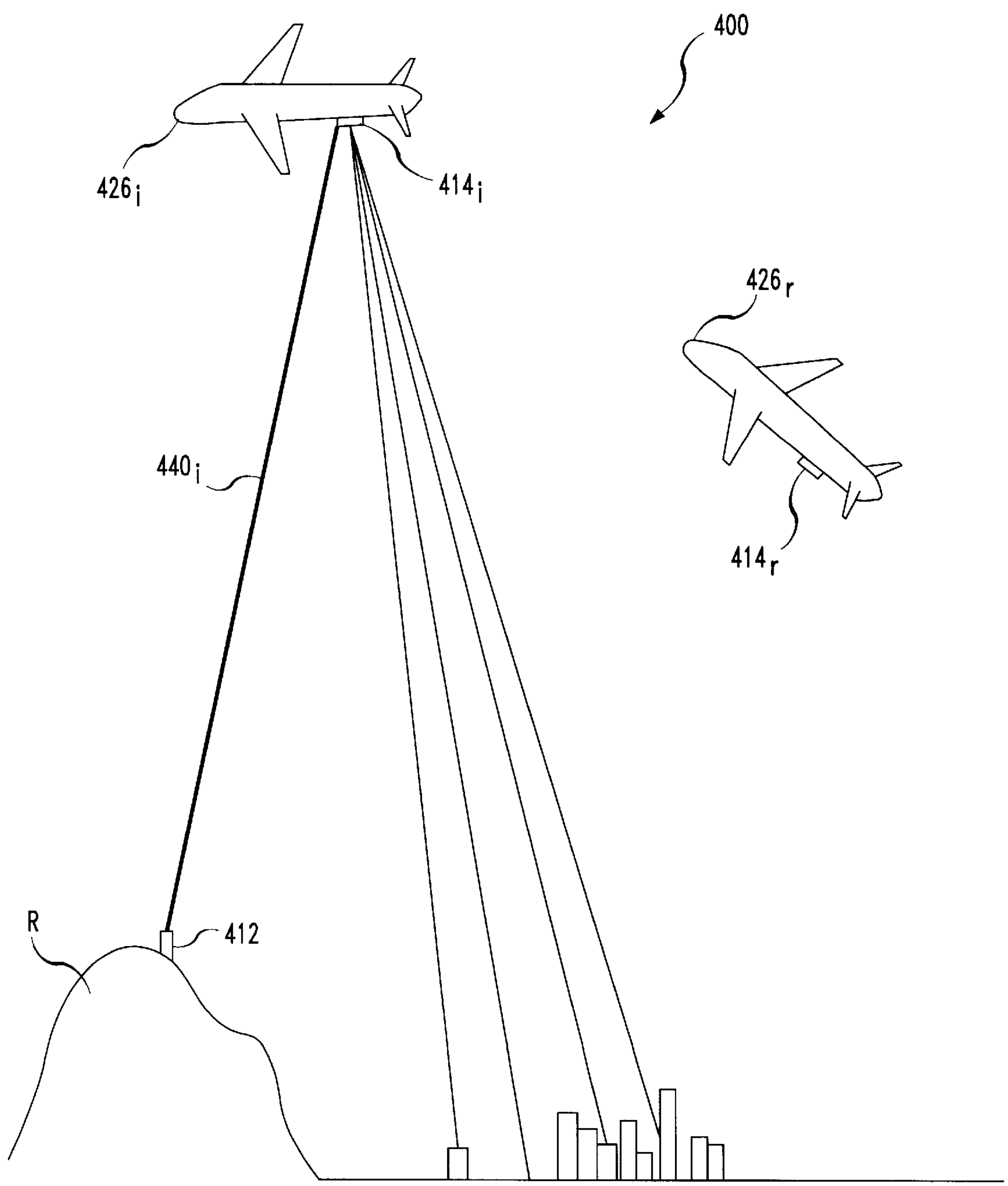

FIG. 4 illustrates wireless telecommunications system 400. Each platform $\mathbf{426}_i$ supporting base station $\mathbf{414}_i$ in wireless telecommunications system 400 comprises an aircraft, preferably configured for long range operation, Such as a 747-type aircraft. Several aircraft may be rotated in shifts to service a geographic area. Each shift may be extended by airborne refueling of aircraft $\mathbf{426}_i$. Using conventional techniques, base station $\mathbf{414}_i$ on each aircraft $\mathbf{426}_i$ executes a handoff to base station $\mathbf{414}_r$ on relief aircraft $\mathbf{426}_r$. Handoffs are coordinated by wireless switching center 412 via microwave link $\mathbf{440}_i$. Subsequently, all communication sessions with wireless terminals would be handled by relief aircraft $\mathbf{426}_r$.

Wireless telecommunications system 400 may provide temporary communications within a geographic area in which telecommunications capability has been lost. Wireless telecommunications system 400 may also be used to provide emergency telecommunications within a geographic area having no telecommunications capability. Aircraft $\mathbf{426}_i$ may be flown in a substantially circular pattern at any altitude above the geographic area being serviced.

It is to be understood that the above description presents illustrative embodiments only. Numerous other arrangements may be devised by one skilled in the art without departing from the scope of the invention.

What is claimed is:

1. A cellular-type wireless communications system comprising:

a wireless switching center connected to a telephone network;

a plurality of airborne base stations each associated with a cell corresponding to a specific geographic area, each airborne base station operable to directly transmit and receive communication signals to/from individual subscriber terminals within the associated cell and to/from said wireless switching center to enable communication sessions to be maintained, through the telephone network, between individual subscriber terminals and other telecommunication terminals, said plurality of airborne base stations including at least one antenna for communicating with said wireless switching center and with individual subscriber terminals in an associated cell; and each of said plurality of airborne base stations being supported by at least one airborne platform including a propulsion system, the propulsion system being mounted on the airborne platform and being operable to maintain the platform airborne above a geographic area being serviced by the airborne base station; and each of said plurality of airborne base stations being operative, in conjunction with the wireless switching center, to hand off communication sessions with subscriber terminals to at least one other airborne base station.

2. A wireless communications system according to claim 1 wherein the platform includes a high altitude balloon.

3. A wireless communications system according to claim 1 wherein the propulsion system includes a propeller driven by an electric motor.

4. A wireless communication is system according to claim 3 further including a battery power supply and a solar panel, said battery power supply and said solar panel being operable to power said propulsion system.

5. A wireless communications system according to claim 4 wherein said solar panel is operable to recharge said battery power supply.

6. A wireless communications system according to claim 4 wherein said battery power supply is operable to power said propulsion system during nighttime operation and said solar panel is operable to power said propulsion system during daytime operation.

7. A wireless communications system according to claim 1 wherein said propulsion system maintains said platform at an altitude of about 15 to about 20 miles above sea level.

8. A wireless communications system according to claim 7 wherein the platform is maintained at an altitude of about 15 miles above sea level.

9. A wireless communications system according to claim 1 wherein said at least one antenna comprises at least one high gain, narrow beam antenna.

10. A wireless communications system according to claim 1 wherein the platform includes an aircraft.

11. A wireless communication system according to claim 1, wherein the at least one airborne base station includes first and second airborne base stations, said first airborne base station communicating with said second airborne base station via a microwave link.

12. A method for wireless communications in a geographic area comprising:

positioning a mobile switching center at a location to facilitate communication in the geographic area, said mobile switching center switching calls between ones of a plurality of airborne base stations and a telephone network;

positioning a plurality of airborne platforms above the geographic area;

supporting said plurality of airborne base stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals; and handing off communication sessions of subscriber terminals from one of said plurality of airborne base stations to at least one other of said plurality of airborne base stations.

13. A method according to claim 10 wherein the step of positioning the platform comprises positioning the platform at a location to minimize interference with transient aircraft.

14. A method according to claim 12 wherein the step of positioning the platform further comprises positioning the platform at an altitude of about 15 to about 20 miles above sea level.

15. A method according to claim 12 wherein the step of positioning the platform comprises positioning the platform at an altitude of approximately 15 miles above sea level.

16. A cellular-type wireless communications system comprising:

a wireless switching center connected to a telephone network;

a plurality of airborne base stations each associated with a cell corresponding to a specific geographic area, each of said plurality of airborne base stations operable to directly transmit and receive communication signals to/from individual subscriber terminals within the associated cell and to/from said wireless switching center to enable communication sessions to be maintained, through the telephone network, between individual subscriber terminals and other telecommunication terminals; and at least one of said plurality of airborne base stations having at least one antenna for communicating with said wireless switching center and with individual subscriber terminals in a specific geographic region, said plurality of airborne base stations comprising at least a first airborne base station supported by a first aircraft that rotates in shifts above the geographic region with a second airborne base station supported by a second, relief aircraft.

17. The wireless communications system of claim 16, wherein said first airborne base station is operative to hand off communication sessions with subscriber terminals to the second airborne base station, said wireless switching center coordinating handoffs between the first and second airborne base stations.

18. The wireless communications system of claim 16, wherein each said aircraft flies in a pattern during its shift.

19. The wireless communications system of claim 18, wherein said pattern is circular.

* * * * *